United States Patent [19]
Herud

[11] 3,710,572
[45] Jan. 16, 1973

[54] THRUST CHAMBER
[75] Inventor: Frank R. Herud, Williamsville, N.Y.
[73] Assignee: Textron Inc., Providence, R.I.
[22] Filed: Jan. 4, 1971
[21] Appl. No.: 103,758

[52] U.S. Cl. .................60/204, 29/419, 60/265, 60/266, 165/52, 165/185
[51] Int. Cl. ............................................F02k 11/00
[58] Field of Search.......29/157 C, 419, 452; 60/206, 60/265, 266, 204; 165/52, 185; 239/129, 265.15

[56] References Cited

UNITED STATES PATENTS

| | | | |
|---|---|---|---|
| 3,383,862 | 5/1968 | Novotny | 60/260 X |
| 3,451,222 | 6/1069 | Kelley | 60/258 |
| 3,439,502 | 4/1969 | Lee | 60/265 X |

Primary Examiner—William F. O'Dea
Assistant Examiner—P. D. Ferguson
Attorney—Bean & Bean

[57] ABSTRACT

A rocket engine thrust chamber comprising a combustion chamber having its fuel inlet-mixing section and thrust nozzle section formed of integrally interconnecting pyrolyzed graphite filaments so oriented and extended that the fibers thereof individually interconnect the thrust nozzle throat and fuel inlet-mixing sections of the engine, and provide more effective heat conduction from the nozzle throat section to the fuel inlet-mixing section. Accordingly, the temperature of the nozzle throat section is significantly lowered, and the fuel reactants are preheated in improved manner. The disclosure also relates to methods of fabricating and operating such engines.

12 Claims, 13 Drawing Figures

INVENTOR
FRANK R. HERUD
BY
ATTORNEYS

THRUST CHAMBER

BACKGROUND AND INTRODUCTION TO THE INVENTION

In the construction and operation of rocket engines, especially with cryogenic or other "exotic" or high temperature fuels, a difficult problem often encountered is to find a satisfactory material of construction which can withstand the temperatures involved. This survival problem is most evident at the throat portion of the thrust nozzle which encounters the highest gas velocities and temperatures, and therefore the severest thermal and mechanical stresses. In the past, attempts have been made to solve this problem by employing special high temperature-resistant metals and alloys and/or ceramics for the critical parts and/or by cooling the rocket nozzle, as by circulating coolants in thermal contact with the nozzle wall structure. Also, efforts have been made to utilize heat-conductive materials in the chamber construction, with a view to carrying away excess heat from the nozzle portions. However, the materials previously employed for such purposes have involved certain disadvantages which limited their results and usefulness. For example, beryllium (which is a good heat conductor) melts at 2,345° F. and requires an excessive amount of coolant to prevent fusion thereof during use. Pyrolytic graphite sections, which also have been tried, have been found to alloy intolerable leakages of the combustion gases through the joints between the sections.

This invention provides an advance over the prior art in that it provides thrust chambers for rocket engines in which improved means are employed to lower the temperature of the thrust nozzle throat portion by more effectively conducting heat away from it, while at the same time utilizing the heat to preheat the fuels as they are injected into the chamber. The heat conducting means employed comprises a plurality of pyrolyzed graphite fibers or filaments which are so oriented and extended as to individually interconnect in efficient heat exchange relation the thrust nozzle throat portion and the fuel inlet-mixing section of the combustion chamber. The graphite filaments terminate at and form wall portions of the exit throat and fuel inlet sections respectively of the thrust chamber and are, of course, highly resistant to the high temperatures encountered thereat. The invention also relates to methods of making and operating the described thrust chambers.

GENERAL DESCRIPTION OF THE INVENTION

This invention contemplates a thrust chamber fabricated primarily of pyrolyzed graphite filaments which are extremely resistant to high temperatures, such as those resulting from the burning of rocket fuels while yet being sufficiently structurally strong to provide a sufficiently gas-tight thrust chamber. Additionally, because of their special thermal conductivity characteristics, the heat transfer components of the walls of this thrust chamber conduct heat better along the lines thereof than in directions across such lines. Thus, improved means are provided for cooling the nozzle section of the thrust chamber, especially the throat portion thereof, by conveying heat away from it through the graphite filaments.

In accordance with the present invention there is provided an improved thrust chamber wherein chemicals are reacted to produce heat and generate thrusting power. The chamber comprises a fuel inlet or injection section, wherein the reactants meet and mix; an intermediate "combustion" section wherein the reaction proceeds; and an exit nozzle section wherein the reaction is carried to completion and through which the reaction products are discharged. The nozzle section operates at the highest temperature of the three sections (due to a higher degree of completion of reaction and high velocity passage of the reactants through the throat) and is interconnected in heat exchange relation with the inlet section by means of highly heat-conductive carbon filaments, which are so fabricated and arranged as to provide the basic structure of the chamber, while also conducting heat from the nozzle section to the inlet and mixing sections, thereby lowering the temperatures of the nozzle section walls and adding heat to the reaction mixtures in the inlet and mixing sections. Also, the invention contemplates certain specific embodiments of such chambers, methods of manufacturing such chambers, and uses thereof.

In a gas generating unitary thrust chamber construction of elongated conduit form providing a reactant/gas passage bore therethrough wherein fuel and oxidizer supplies are reacted, with high heat concomitance, and which comprises in directional sequence: a mixing section wherein the reactants are blended; an intermediate reaction section wherein the reaction proceeds; and a nozzle section wherein the reaction is carried to completion and which includes a throat portion through which the gas products exit; the inventive improvement comprises a chamber wall construction formed substantially throughout of a densified pyrolyzed integration of graphite filaments layered in criss-cross spirally wound relation so arranged as to circumscribe and span said mixing-reaction-nozzle sections and to interface at their opposite ends the chamber bore in the regions of the mixing and nozzle sections thereof, whereby said filaments effectively operate to conduct heat away from the throat section of said chamber to provide an improved nozzle section cooling facility. Graphite filaments are wound in substantially parallel paths and conduct heat from the nozzle section to the mixing section. The filaments are arcuately wound and interface at their ends with substantially all the surface areas of said nozzle and mixing sections. Preferably, the graphite filaments are wound about a pyrolyzed solid graphite core, a part of which core forms a portion of the wall of the intermediate section of the chamber.

In the manufacture of the above described chamber construction a mandrel or a pyrolized graphite core intended for use as part of the chamber, with the interior portion thereof being part of the intermediate chamber wall, is covered with graphite filaments which are wound so as to extend substantially from one end of the mandrel to the other and far enough beyond to form mixing and nozzle section walls, the assembly is removed, the interior thereof is shaped to the bore of a thrust chamber, and the assembly is pyrolized to produce a structurally stable chamber construction with the heat conductive graphite filaments therein extending between the nozzle and mixing sections thereof so as to conduct heat away from the nozzle section. In the practice of such method the graphite filaments are wound in the form of a plurality of layers in spiral or criss-cross fashion, with each filament being substantially parallel to the next adjoining filament and with the total thicknesses of the layers being at least equal to the lengths of the mixing and nozzle sections. Subsequently, graphite cloth may be employed to cover the graphite filament winding assembly and after completion of pyrolysis the assembly may be encased in a refractory shell.

Objects and details of construction and operation and advantages of the invented apparatus and methods will be apparent from the following description when taken in conjunction with the accompanying illustrative drawing of preferred embodiments of the invention, in which drawing:

THE DRAWING

Figure 4:
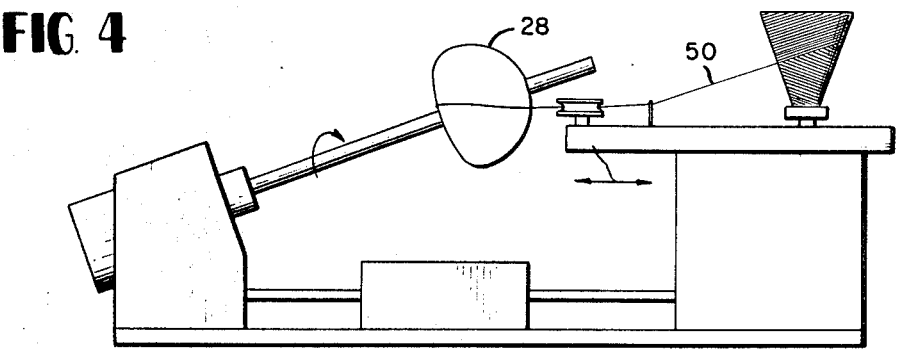
FIG. 4 shows, by way of example, a mechanism for winding graphite filaments about a preformed annular shaped solid graphite core to fabricate a structure of the invention wherein are provided thermally conductive paths for heat flow from the heat generating region to the heat absorbing region of the thrust chamber of FIGS. 1-3.
Figure 5:
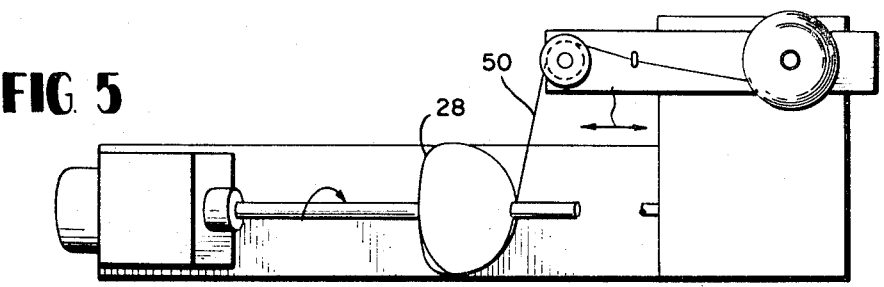
FIG. 5 is a top plan view of the winding mechanism of FIG. 4.
Figure 6A:
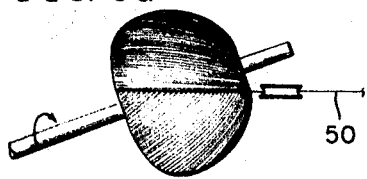
Figure 6B:
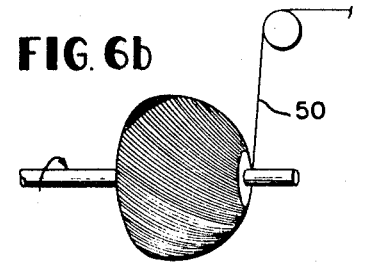
Figure 8A:
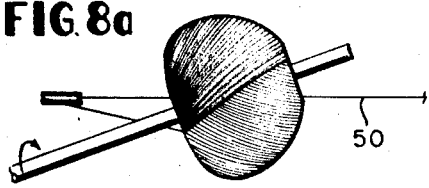
Figure 7A:
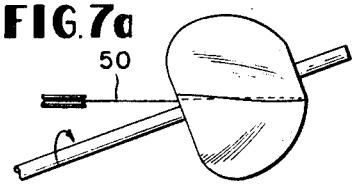
Figure 7B:
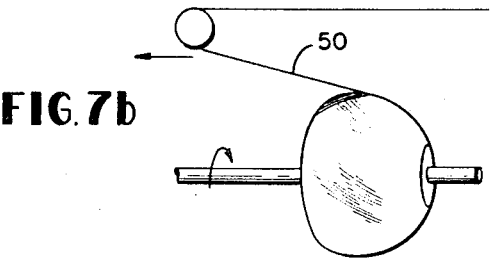
Figure 8B:
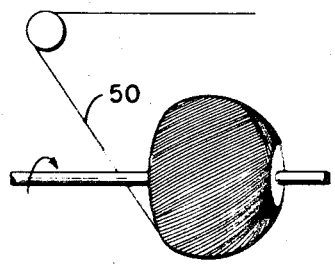
Figure 10:
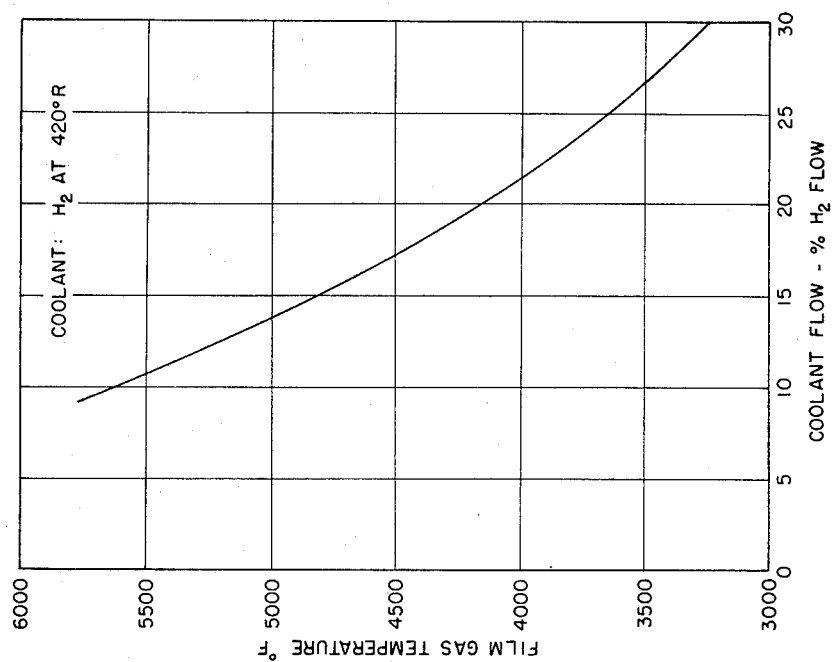
Figure 9:
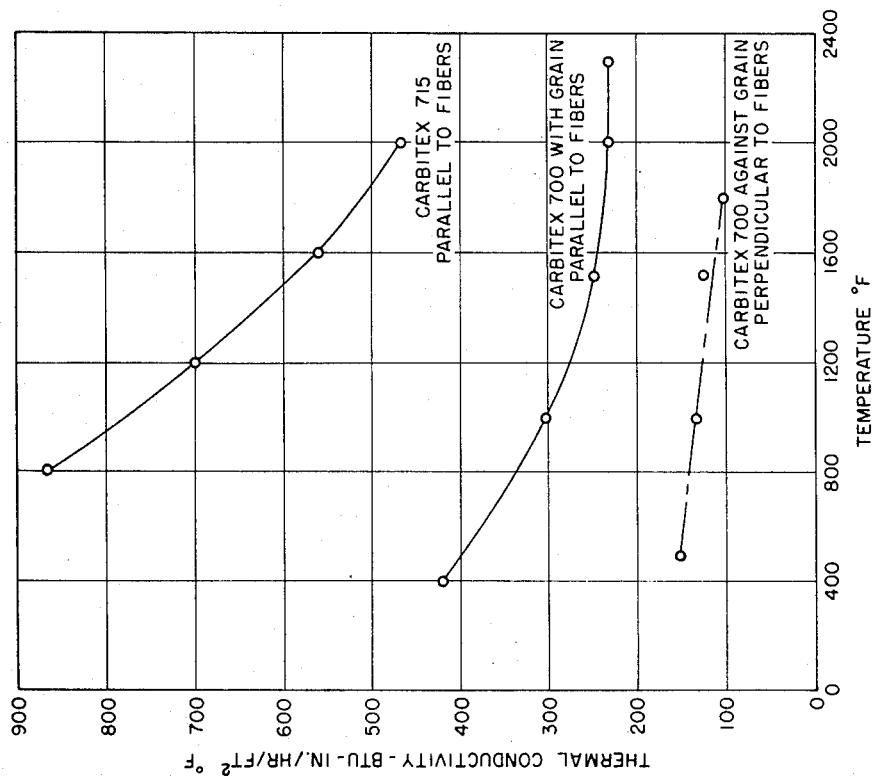

FIGS. 6a–6b, 7a–7b, 8a–8b, corresponding to a part of FIG. 4, show how the windings of graphite filaments are applied;

FIG. 9 is a plot of temperature vs. thermal conductivity for pyrolyzed graphite filaments, showing by way of comparison the thermal conductivities of such materials in the direction of their fibers and across them; and FIG. 10 is a plot of percentage of coolant (fuel) flowed into contact with the fuel inlet section wall, against film gas temperature at the throat of the nozzle section of a thrust chamber powered by reaction of hydrogen (fuel) and oxygen (oxidizer).

DETAILED DESCRIPTION OF THE INVENTION

Figure 1:
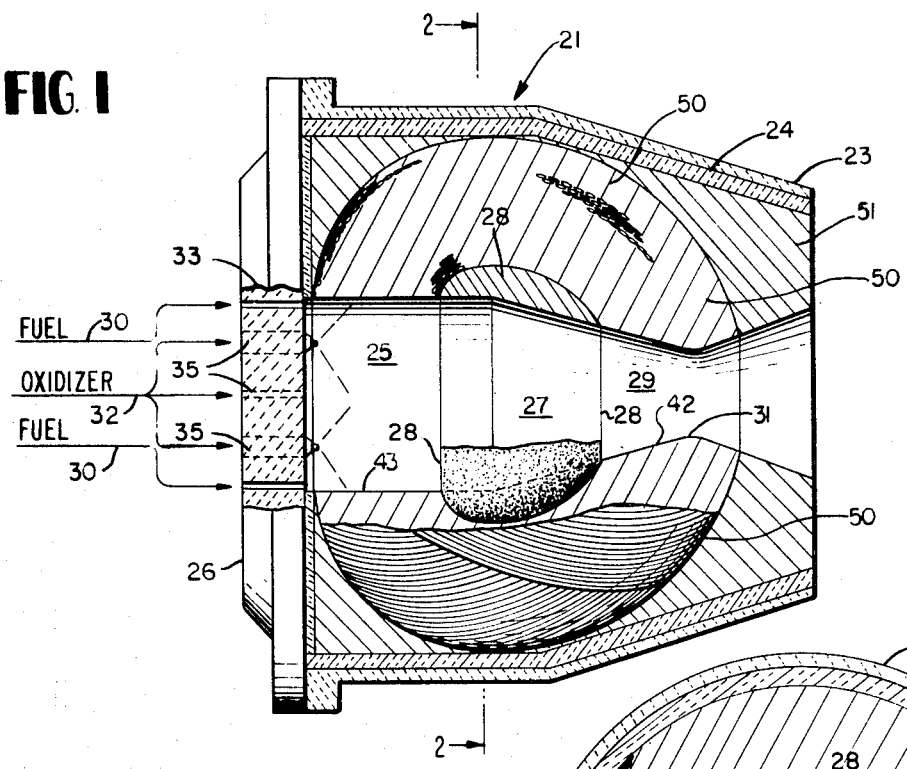
FIG. 1 is a partially centrally sectioned/elevational view of a rocket engine thrust chamber in accordance with this invention.
Figure 2:
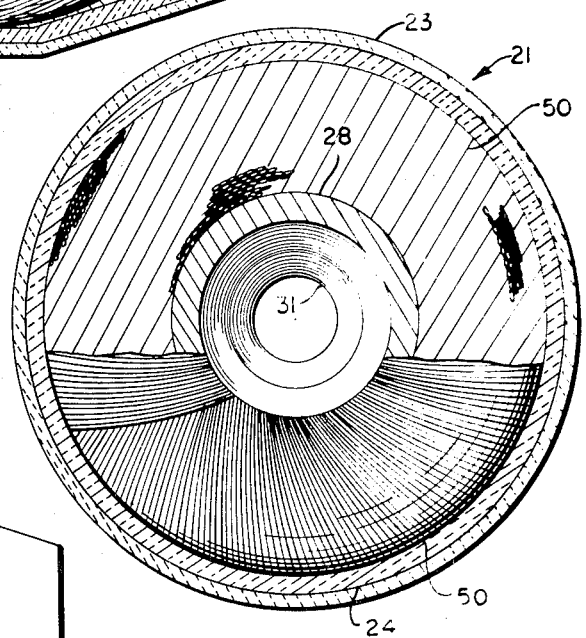
FIG. 2 is a partially sectioned/elevational view of such thrust chamber taken as suggested by line 2—2 of FIG. 1.

As is illustrated in FIGS. 1 and 2, a thrust chamber of the present invention may be constructed as indicated generally at 21, to include a shell 23 housing a fuel inlet and mixing section 25 wherein the reactants are intimately blended; a convergently shaped intermediate "combustion" section 27 (wherein the chemical reaction which generates heat and thrusting power proceeds); and a convergent/divergent shaped thrust nozzle or throat section 29 wherein the reaction is carried to completion and through which the gaseous reaction products are expelled Numeral 42 represents the wall of this section. Typically, the portion of the thrust chamber which is exposed to the highest temperatures upon operation of the engine is the constricted throat portion thereof as indicated at 31, against which the high temperature burning gases impinge at great velocities. The shell 23 is closed at the fuel intake end by means of a plate 26.

A fuel supply as represented by numeral 30 at FIG. 1 may be employed either in gaseous form or in a liquid form which is readily convertible to the gaseous state, and fuel is fed through core injectors 33 into the combustion chamber where it makes contact with the oxidizer supply which is represented by 32 and from which oxidizer is admitted to the mixing section 25 through passageways 35. In one form of preferred operation the fuel is gaseous hydrogen and the oxidizer is largely gaseous oxygen. As will be explained hereinafter, the mixing section 25 acts as a heat absorbing region or "heat sink" and the structure is so arranged that as the fuel supply is injected into the chamber 25 it cools the wall 43 thereof as it flows therealong as indicated by arrows 37 (FIG. 3).

An annular core of solid graphite encompasses portions of the combustion chamber 25 and the convergent section 27, and forms the inner liner thereof. This core supplements the mandrel shape to cause the filaments 50 when wound thereon to assume the configurations shown in the drawing, whereby they function as efficient heat conduits carrying heat away from the nozzle section. Also the core structure provides an improved abrasion-erosion resistant liner for the chamber in the region of highest temperatures and velocities therethrough. This core may be fabricated either by initially molding or casting it in ball form and then boring it, or by machining it out of a solid block of material. In any case, the core member is then mounted upon a spindle, as illustrated at FIGS. 4—8, inclusive, to receive the graphite filament windings referred to hereinabove. Thus, the core member 28 functions during this stage of manufacture as a mandrel upon and about which graphite filaments are criss-cross layered as in the manner of winding a ball of string. After the filaments are so wound upon the core and mandrel the assembly is debulked into dense form, and thereupon the assembly is subjected to a pyrolysis treatment.

Figure 3:
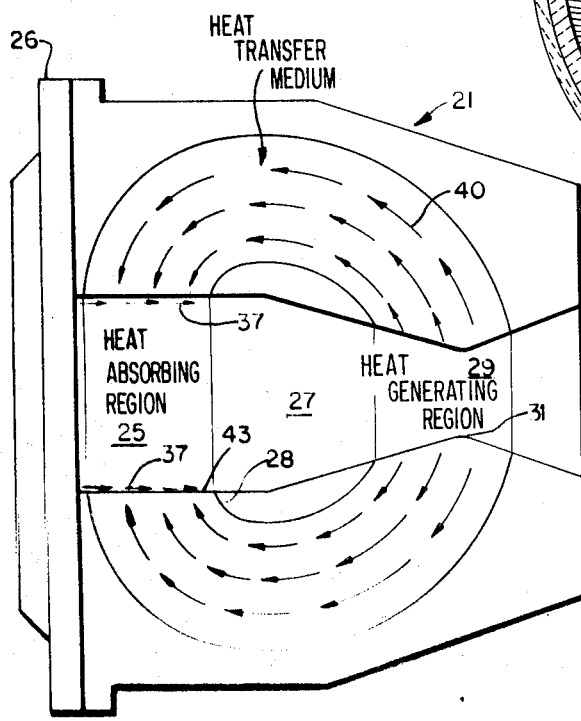
FIG. 3 is a schematic view corresponding to FIG. 1, showing heat flows from the heat generating region (nozzle section) to a heat absorbing region of the rocket engine thrust chamber.

This integrates the core and filament assembly into a solid mass wherein the filaments are directionally oriented so as to be highly efficient in conduction of heat from the throat section 29 back to the fuel inlet-mixing section of the engine, as illustrated at FIG. 3. Whereas FIG. 3 of the drawing herewith diagrammatically illustrates conduction of heat from the throat section of the engine back into the fuel inlet-mixing section, by means of simple curved directional arrows 40, it will be appreciated that the paths of heat conduction are actually of spiral form because of the circuitous directions of the filament windings. To augment the structural integrity of the assembly the pyrolyzed ball of filaments may be wrapped in graphite cloth as illustrated at 51, or other suitable material such as glass, cloth, or the like, and the assembly is preferably then encased within a thermal barrier 24 to facilitate handling and packaging of the assembly within the shell 23.

In operation of the thrust chamber the exit nozzle section is cooled by conducting heat away from it along paths of the wound pyrolytic graphite filaments to a heat sink of lower temperature than the nozzle section, which heat sink preferably comprises the mixing section of the thrust chamber. The pyrolytic graphite filaments thermally interconnect the walls of the nozzle and mixing sections by spiral, curved or criss-cross paths and at least a portion of the wall of the mixing section is cooled by having directed onto it at least a portion of a reactant supply. The cooling of the mixing section wall causes heat to flow from the thrust chamber through the graphite filaments to the mixing section wall, thereby cooling the thrust chamber nozzle wall. To assist in making the cooling most efficient, the graphite filaments, which conduct heat more readily longitudinally than transversely, are maintained out of contact with the intermediate section of the thrust chamber.

FIG. 9 graphically illustrates the relative heat conductivities of the fibers in the directions of their windings versus directions perpendicular thereto, and it will be seen that by virtue of the present invention a highly efficient and greatly improved heat transfer effect is attained. It is well known that hydrogen is a preferred coolant for rocket engines and accordingly, in the case of the present invention it may with facility be typically employed, both as the fuel and as the coolant. FIG. 10 illustrates graphically the cooling performance of hydrogen when employed in the engine of the invention.

I claim:

1. In a gas generating unitary thrust chamber construction of elongate conduit form providing a reactant/gas passage bore therethrough wherein fuel and oxidizer supplies are reacted, with high heat concomitance, and which comprises in directional sequence: a mixing section wherein the reactants are blended; an intermediate reaction section wherein the reaction proceeds; and a nozzle section wherein the reaction is carried to completion and which includes a throat portion through which the gas products exit; the improvement comprising:

a chamber wall construction formed substantially throughout of a densified pyrolyzed integration of graphite filaments layered in criss-cross spirally wound relation so arranged as to circumscribe and span said mixing-reaction-nozzle sections and to interface at their opposite ends the chamber bore in the regions of the mixing and nozzle sections thereof, whereby said filaments effectively operate to conduct heat away from the throat section of said chamber to provide an improved nozzle section cooling facility.

2. A thrust chamber according to claim 1 wherein said filaments are wound in substantially parallel paths and conduct heat from said nozzle section to said mixing section.

3. A thrust chamber according to claim 2 wherein the carbon filaments are arcuately wound and interface at their ends with substantially all the surface areas of said nozzle and mixing sections, and the paths of heat flow from said nozzle section to said mixing section are along the lengths of said filaments.

4. A thrust chamber according to claim 3 which comprises means for directing at least a portion of reactant charged to the mixing chamber along the external walls thereof, whereby heat transfer away from the nozzle section to said walls is improved and the walls of the nozzle section are cooled.

5. A thrust chamber according to claim 4 wherein the graphite filaments are wound about a pyrolyzed solid graphite core, a part of which core forms a portion of the wall of the intermediate section of the chamber.

6. A method of making a thrust chamber construction having mixing, intermediate and exit nozzle sections which comprises:

covering a mandrel with graphite filaments by winding them thereon to extend substantially from one end of the mandrel to the other, removing the assembly and shaping the interior thereof to the shape of the bore of a thrust chamber, and pyrolyzing the assembly to produce a structurally stable chamber construction having heat conductive graphite filaments therein so disposed and extending between the nozzle section thereof and the mixing section to conduct heat away from the nozzle section.

7. A method according to claim 6 wherein the graphite filaments are wound in the form of a plurality of layers of filaments each substantially parallel to the next adjoining filaments; the total thicknesses of the layers of which are at least equal to the lengths of the mixing and nozzle sections.

8. A method according to claim 7 wherein graphite cloth is employed to cover the graphite filament winding assembly, and wherein upon completion of pyrolysis, the assembly is encased in a refractory shell.

9. A method of cooling the exit nozzle section of a thrust chamber which comprises conducting heat away from said nozzle section along paths of pyrolytic graphite filaments to a heat sink of lower temperature than said nozzle section, said filaments being in criss-cross spirally wound relation so arranged as to circumscribe and span said nozzle section and said heat sink and to interface at their opposite ends the nozzle section and heat sink walls, whereby said filaments effectively operate to conduct heat away from the nozzle section of the thrust chamber.

10. A method according to claim 9 wherein the heat sink comprises said mixing section of the thrust chamber.

11. A method according to claim 10 wherein the pyrolytic graphite filaments thermally interconnect the walls of the nozzle and mixing sections of the reaction chamber, and at least a portion of the wall of the mixing section is cooled by having directed onto it at least a portion of a reactant supply.

12. A method according to claim 11 wherein the thrust chamber is the site of reaction of a fuel and an oxidizer and at least part of the fuel is directed onto the mixing section of the chamber wall, and wherein the graphite filaments which conduct heat more readily longitudinally than transversely thereof are maintained out of contact with the intermediate section of the chamber.

* * * * *